May 21, 1957 C. F. PULVARI 2,793,288

APPARATUS FOR ELECTROSTATIC RECORDING AND REPRODUCING

Filed Feb. 21, 1950 2 Sheets-Sheet 1

INVENTOR

CHARLES F. PULVARI

BY Eric D. Frankel

PATENT AGENT

APPARATUS FOR ELECTROSTATIC RECORDING AND REPRODUCING

Filed Feb. 21, 1950 2 Sheets-Sheet 2

INVENTOR
CHARLES F. PULVARI

BY Emil D. Frankel

PATENT AGENT

United States Patent Office 2,793,288

Patented May 21, 1957

2,793,288

APPARATUS FOR ELECTROSTATIC RECORDING AND REPRODUCING

Charles F. Pulvari, Arlington, Va.

Application February 21, 1950, Serial No. 145,361

34 Claims. (Cl. 250—27)

The present invention relates to an electrostatic recording and reproducing system or apparatus in which a smaller or larger number of signals representing the information or intelligence to be "stored" can be recorded and subsequently reproduced after a shorter or larger period of time has elapsed since the recording. Devices of this kind handling bits of information of the binary digit or "yes" or "no" type or modulation of electric signals are called memory devices.

It is an object of the present invention to employ as dielectric materials between the conductive plates or layers of electric condensers in a memory device substances with ferro-electric properties which can be remanently polarized and depolarized or changed in their piezo-electric property under the action of electrostatic forces. Suitably said forces are obtained with the aid of electrons directed to and impinging upon the ends of conductive strips or conductors accessible at one side of a condenser structure, for example, a three-dimensional multi-condenser body incorporating a plurality of such condensers, to record or store one bit of information in each of them. The bits of information stored in these condensers can be reproduced in a similar manner. Various materials may be used in this device as dielectric substances with ferro-electric properties. Suitable materials for these dielectric layers are zirconates and titanates, such as barium titanate ($BaTiO_3$) which may be mixed with strontium titanate ($SrTiO_3$). Small amount of materials, such as lead, may be added to and/or impurities may be present in the latter mixture. The properties of these titanates are described in:

"The Physical Review," January 1949, vol. 75, pp. 103–106 (Ferro Electric Barkhausen Effect in $BaTiO_3$) by R. R. Newton, A. I. Ahearn and K. G. McKay.

"Acta Crystallographica," April 1949, vol. 2, pp. 90–93 (Domain Orientation in Polycrystalline $BaTiO_3$) by G. C. Danielson.

"The Phyical Review," December 1948, vol. 74, pp. 1622–1636 (Theoretical Model For Barium Titanate) by W. P. Mason and B. T. Matthias.

"The Phyical Review," November 1948, vol. 74, pp. 1134–1147 (Electrostrictive Effect in Barium Titanate Ceramics) by W. Mason.

These substances are merely examples of polarizable and piezo-electric materials, adapted as dielectric according to the invention. Other dielectric substances with ferro-electric, i. e. piezo-electric properties may be employed as dielectric in the inventive structures.

It is another object of this invention to provide a large number of, preferably, extremely small condensers in a unitary structure or body, said small condensers being arranged to be individually and electrically acted upon one after the other to successively record one bit of information of the binary digit or "yes" or "no" type or other modulations of electric signals in each of them.

It is another object of this invention to connect the aforementioned small condensers with inductances in order to obtain a time delay line. The time delay may be detected by applying suitable pulses to the condensers. As a result of this, electric pulses are obtained on the closing impedance or resistance of the time delay line. The individual small condensers or groups thereof may be interconnected by any type of impedances to form suitable networks or lines.

It is a further and important object of the present invention to provide a dielectric or semiconductive material between the conductive plates or layers of the aforementioned small ferro-electric condensers, having such property that the portions of the ferro-electric material between the respective conductive plates or layers of said individual small condensers can be instantaneously and independently remanently polarized or depolarized or changed in their piezo-electric property, when said condensers are acted upon and while each portion of ferro-electric material is at a temperature below its Curie point, whereupon the bits of information can be reproduced by detecting the polarized or depolarized or changed piezo-electric property conditions in these individual condensers in the same sequence as they were acted upon during the recording. The one of the conductive plates or layers of these small condensers may be made of a single layer piece, while the other of these plates or layers are small conductive or metal pieces of suitable shape being attached to conductors, the free ends of which are accessible at the outside of the unitary or multicondenser structure or body for scanning operations during the recording and the reproducing steps. A common uniform layer of dielectric material may be used in said unitary structure or multicondenser body, said layer having the aforementioned property. Each of the portions of the dielectric material between two opposite conductive plates or layers of the individual condensers is the seat of "storage" of one bit of information recorded therein by changes in the remanent polarization or piezo-electric property of the material.

It is a still further object of the present invention to provide means to heat the dielectric layers to a temperature below the transition temperature, i. e. a temperature, at which the intramolecular and intermolecular or crystalline structure of the dielectric material can be changed, and to maintain said temperature during the recording step, if desired. The transition temperature of the ferro-electric dielectric layers is in the neighborhood of the Curie point.

It is a still further and important object of this invention to incorporate these small condensers into a unitary structure by providing series of electrically conductive strips insulated from and parallel with respect to one another in superimposed relationship to another series of strips crossing each other at an angle, suitably a right angle, and being separated and insulated from each other by dielectric material having the property described in the foregoing. The conductive strips in this construction are referred hereinafter as lattice.

It is a still further object of this invention to provide a laminated, three-dimensional, brick-shaped or cubical multicondenser by superimposing several groups of layers of multicondenser-units constructed in the manner described in the foregoing, and interposing insulating layers having a relatively low dielectric constant between them, so that practically no electrical interference between the superimposed individual condensers of the different groups of layers will take place.

Still other objects of the invention are suitable methods of operating the new recording and reproducing apparatus.

Other objects of the invention are electric and auxiliary devices to be associated with the new multicondenser which may include a cathode ray tube in which said multi-condenser is built, a scanning system for successively influencing the individual condensers to record one bit of information in each of them and to detect their electric conditions in the same sequence during the reproducing, means to exert mechanical stresses on the dielectric layers during the reproducing and means to preorient the individual condensers by applying a voltage across the latter prior to the recording.

Other and further objects of the present invention will be more fully understood by reference to the following description and the accompanying drawings, illustrating preferred embodiments thereof, wherein.

Figures 1, 3, 4:
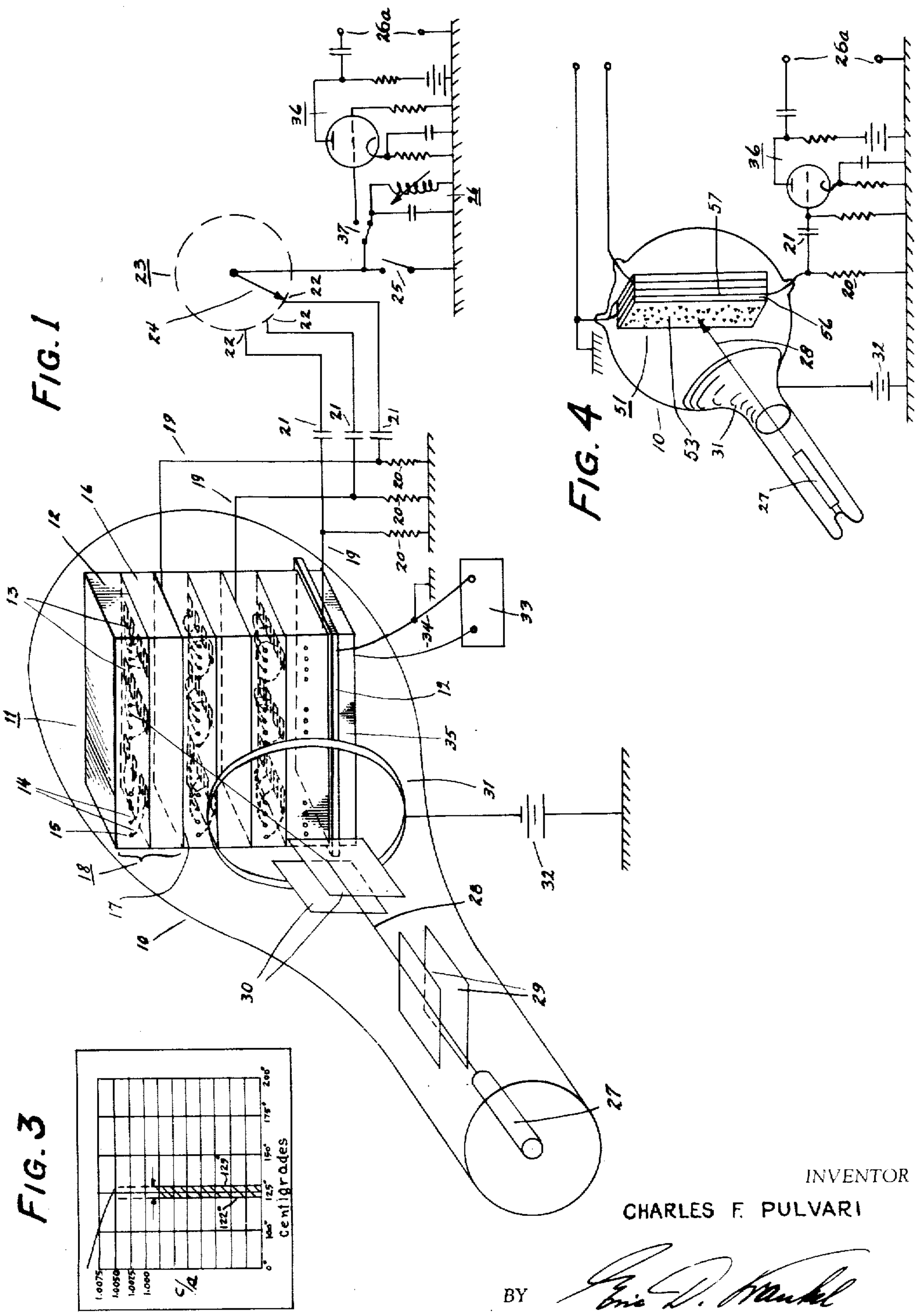
Fig. 1 is a diagrammatic, perspective view of one embodiment of this invention, including the essential parts of the circuit.
Fig. 3 is a temperature diagram of barium titanate to be used as dielectric material, showing its Curie point.
Fig. 4 is a diagrammatic, perspective view of a third embodiment of the invention, including the essential parts of the circuit.

Referring more particularly to the drawings, Fig. 1 shows diagrammatically in a cathode ray tube 10 a multi-condenser body or three-dimensional condenser structure comprising ferroelectric material as a dielectric 11 built up by superimposing a great number of layers. For the sake of clarity, only few of these layers are shown in the drawing and for the same reason only few individual condensers are indicated in the layers, all condenser parts being illustrated in much larger sizes than actually used. Beginning with the top of the body 11, the first layer 12 is suitably made of a plastic or moldable insulating material of the type conventionally employed in the telephone and cable industries, said material having a relatively low dielectric constant, for example, between 1 to 80. A number of small metal pieces or foils 13 of any shape is provided on the lower surface of said first insulating layer 12, said pieces or foils being arranged in such a manner that they do not contact one another. Conductors 14 running through the layer 12 are electrically connected with said metal pieces or foils 13, i. e. there is provided one conductor 14 for each metal piece or foil 13, said conductors 14 being electrically insulated from one another and being arranged in such a manner, that they have no appreciable capacity with respect to each other and the condenser plates of the structure. The conductors 14 terminate in free ends 15 arranged in a horizontal line or row and being accessible at one front side of the layer 12. The entire lower surface of this first layer 12 together with the metal pieces or foils 13 is coated or provided with a layer 16 of a dielectric substance with ferro-electric properties, which can be remanently polarized or depolarized or changed in its piezo-electric property while it is at a temperature below its Curie point, such as barium titanate ($BaTiO_3$). In using the term "ferroelectric material" I mean to include any type of such material whether is has a multi-crystalline, highly oriented or single crystal structure.

A thin conductive or metal layer 17 is applied to the bottom surface of the dielectric or barium titanate layer 16, the two layers 17 and 16 having approximately the same area. The metal pieces or foils 13 and the metal layer 17 may be applied by spraying, evaporating or printing. The first or top group or unit 18 of multi-condensers, thus obtained, comprising said first insulating layer 12 provided with the small metal pieces or foils 13 and the conductors 14, the dielectric or barium titanate layer 16 and the conductive or metal layer 17 is supported by a second group or unit 18 of the same construction and so forth. In the embodiment shown in Fig. 1 only three such groups or units 18 are indicated. The individual condensers of one of the groups or units 18 do not electrostatically influence the individual condensers of the adjacent group or unit 18, because the insulating layers 12 having a relatively low dielectric constant separate the superimposed condensers in these groups or units. These insulating layers 12 may be made likewise of ferroelectric material like barium titanate, if these layers are made so thick that the necessary separation of the groups or units is assured. An insulating layer 12 is also provided under the last or lowest of the metal layers 17.

Each of the conductive or metal layers 17 is grounded by means of a conductor 19 through a suitable resistor 20 and is further connected through a condenser 21 to one of the contact segments 22 of a rotary scanning switch 23, the rotatable contact arm 24 of which is adapted to successively connect the individual conductive or metal layers 17 to the ground either directly, i. e. through a closed switch 25, or through a proper impedance circuit represented by 26. It is to be understood that any suitable impedance may be used as a load impedance for the signal plate represented by the metal layer 17.

An electron gun 27 is provided within the tube 10 opposite the front side of the multi-condenser structure or body 11. The electrons of ray 28 emitting from the electron gun 27 and impinging upon the free ends 15 of the conductors 14 of the small metal pieces or foils 13 can be controlled by means of the usual electrostatic horizontal and vertical deflection plates 29 and 30. A collector ring or grid 31 of metal or other conductive material is arranged in front of the multi-condenser structure or body 11 in such a manner that the scanning ray 28 passes freely therethrough. This ring 31 is grounded either directly or, as shown in Fig. 1, through a battery 32 or other direct current source supplying a biasing voltage or through a circuit by which high frequency or other pulses may be applied. The ring or grid 31 providing a conductive path to ground collects the secondary electrons produced by the primary electrons of the ray 28, when the latter impinge upon the free ends 15 of the conductors 14 and or any free electrons.

Prior to the recording step, the dielectric layers 16, for example of ferro electric material, such as barium titanate, have to be rendered uniform in its intermolecular or crystalline structure for instance by uniformly preorienting it, i. e. by applying a suitable charge, across said condensers for a longer or shorter period of time with the aid, for instance, of the cathode ray. In the present example, the condensers are assumed to be preoriented. The current source for applying the preorienting voltage and the switching and circuit means to connect the individual condensers with said source either simultaneously or one after the other are not shown in the drawings but it will be understood by those skilled in the art that this can be done by suitably operating the cathode ray device including its collector ring or grid.

Synchronizing means are provided between the scanning control system of the electron ray 28 and the rotary scanning switch arm 24. These parts and the drive for said contact arm 24 are not shown in the drawing. The ray 28 scans the front surface of the multi-condenser body 11 in principally the same manner as the sweeping cathode ray in a television tube. When starting with the recording, the ray 28 moves from one side to the other along a horizontal path or first line thereby scanning the first horizontal row of the free ends 15 of the conductors 14 and then starts the next line, or second row of free ends 15. During the scanning of the first line or row of conductor ends 15, the contact arm 24 remains on the first of the segments 22. Before the second line or row of conductor ends 15 is to be scanned, the contact arm 24 is moved to the second of the segments 22 by its driving mechanism under control of the synchronizing means and remains in this position until the second scanning line or row has been scanned. Thereafter, the contact arm 24 is moved to the third of the segments 22 and the third line or row of free ends 15 is scanned and so on, until the last line or row is completed. The ferroelectric layers of the, preferably, tiny preoriented condensers in the multi-condenser body 11 are individually and successively depolarized or changed in their polarization properties, or practically not influenced, if the ray 28 is controlled correspondingly by circuit means, not shown in the drawing, whereby a great number of bits of information of the binary or "yes" or "no" type can be stored in the multi-condenser body 11. The cathode ray beam may be controlled by any other type of switching means supplying the necessary electric energy to the individual condensers. If during the scanning, the switch 25 is closed the resonance circuit 26 is short-circuited and inactive. When the switch 25 is open a normal reading operation can be obtained. It will be understood by those skilled in the art that switch 25 could be replaced by a suitable electrical switch device such as a diode or semiconductive rectifier; cathode ray 28 may be modulated by a carrier or pulse frequency, whereby the impedance 26 associated with the scanned condenser is matched to this carrier or pulse frequency. This means that the individual condensers are acted upon by high-frequency, pulsed high-frequency or other suitable pulses to thereby cause a change in the remanent polarization.

To reproduce these bits of information, the scanning cycles with synchronous operation of the rotary switch 23 are carried out as described in the foregoing for the recording step. In the embodiment of my invention shown in Fig. 1, I show a sonic or ultrasonic generator 33 as part of the circuit. Such a generator is one means for producing a current of suitable frequency during the reproducing step, and as will be evident from a reading of my entire description other suitable pulse-producing means could be utilized in lieu of generator 33. This generator 33 is connected through the conductors 34 to a plate 35 of piezo-electric material, which is applied and suitably matched to one side of the multi-condenser body 11, for example, to the bottom of said body. One of the conductors 34, i. e. the conductor connected to the layer of plate 35 closest to the multi-condenser body 11, is grounded. The electric oscillations produced by the sonic or ultra-sonic generator 33 and transmitted to the plate 35, are converted by the latter into mechanical pressures acting on the bottom of the body 11 and transmitted to the dielectric layers 16 between the small metal pieces or foils 13 and the conductive or metal layers 17. When now the scanning step is repeated in the same sequence and manner as during the recording, the conditions of the ferroelectric material in the individual condensers can be detected in the same order as the bits of information were recorded, i. e. the mechanical pressures produced by the oscillations of the generator 33 result in considerable charges in those of the condensers which previously during the recording step have practically not or merely to a lesser extent, been changed in their polarizing condition, or their piezo-electric state.

While in the embodiment of Fig. 1 only a single plate 35 for transmission of the oscillations is provided at the bottom of the multi-condenser body 11, several such plates or elements of any construction may be distributed at various places on and/or in said body 11 and connected with the sonic or ultra-sonic generator. Any other electrical or mechanical oscillator may be used in place of this sonic or ultrasonic generator.

To each group of condensers forming a time-delay line or any other type of network, there may be coordinated a separate ultrasonic driving element which may be pulsed by extremely short high-frequency pulses in any sequence. The ultrasonic pulses thus produced travel along the ultrasonic line, on or in which said condensers are distributed. The traveling mechanical pulses generate charges in the polarized condensers. These charges may be detected on the characteristic resistance of the line or on the detecting or switching terminals of the condenser network.

During the reproducing scanning, the cathode ray 28 changes; i. e., switches the polarization condition which was caused during the recording step. Those condensers in which a change in polarization results due to the reproducing scanning cause a considerable voltage drop to occur in the load circuit represented by resistance 20, capacity 21 and impedance circuit 26, while those condensers in which no change in polarization occurred due to the reproducing scanning cause substantially no signals to be impressed on the aforementioned load circuit. It is obvious that other suitable load circuits may be used in lieu of the one shown in Fig. 1.

The information is reproduced with the aid of any transducer, such as a loudspeaker or another cathode ray tube, to be connected to the circuit at the terminals 26*a*. An amplifier 36 may be preferably inserted in the circuit between the contact arm 24 of the rotary scanning switch 23 and the transducer. The manual switch 37, serves to connect the amplifier circuit to the scanning contact arm 24, i. e. during the reproducing step the switch 37 may be turned to its upper position to disconnect the resonance circuit 26. During this operation, the switch 25 is open. The reproducing of the information may be obtained without the rotary switch 23, in which case the individual condensers 13 will be interconnected by properly designed inductances.

Figures 2, 5:
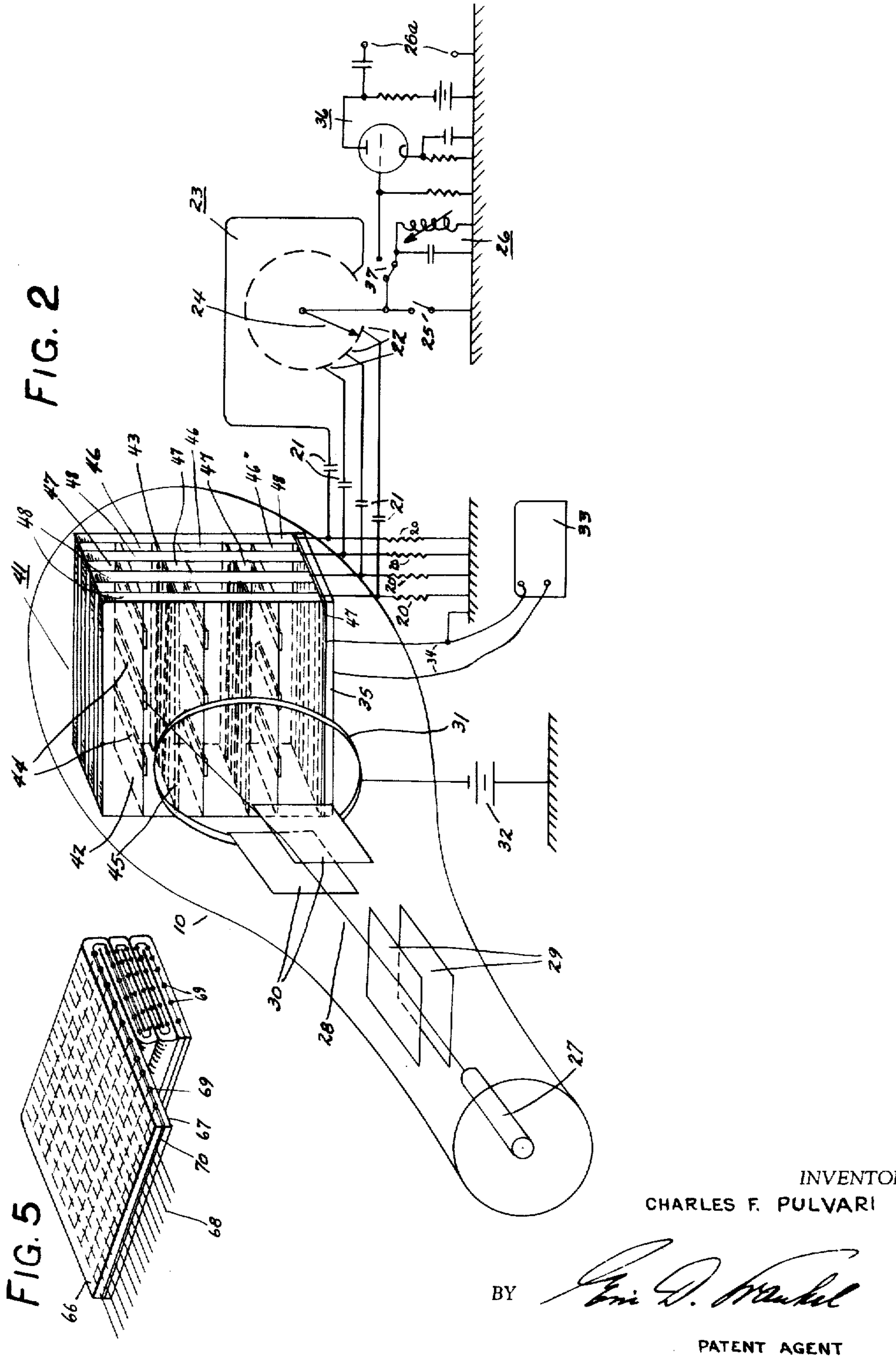
Fig. 2 is a diagrammatic, perspective view of another embodiment of the invention, also including the circuit.
Fig. 5 is a diagrammatic perspective view of a modified multi-condenser, which is one of the essential parts of the new apparatus.

In the modification of the inventive device, shown in Fig. 2, a multi-condenser body 41 is built up by superimposing conductive layers 42 and 43, each comprising a plurality of straight strips 44 and 45, respectively, insulated from one another. These layers are called lattice layers and are disposed horizontally in the embodiment of Fig. 2.

Each of said lattice layers 42 and 43 contains a great number of these electrically conductive straight strips 44 or 45, respectively, which are parallel with respect to one another in the same layer and at right angles with respect to the strips in the adjacent layers, i. e. the strips 44 of the layers 42 are at right angles with respect to the strips 43 of the layers 45. The individual strips 44 and 45 are insulated from one another in each of the layers 42 and 43, respectively, and a relatively thin dielectric layer or coating 46 is provided between each of said horizontal layers 42 and 43, so that a small condenser is obtained at each of the intersections between two strips 44 and 45 of adjacent superimposed layers 42 and 43. One bit of information of the "yes" or "no" or binary type can be stored in each of said individual condensers by changing the remanent polarization condition or piezo-electric property in their ferroelectric dielectric, or not influencing said conditions in the same manner as described in connection with the embodiment of Fig. 1.

The strips 44 and 45 can be made of extremely narrow width so that each of the layers 42 and 43 may contain several hundred or more of them. The conductive strips 44 or 45 may be made of conductive material of any resistance. Inductive and/or capacitive impedances may be distributed in these strips.

The layers and strips of the multi-condenser 41 in Fig. 2 are shown on a considerably enlarged scale, and only few of them are actually illustrated for the sake of clarity. The strips 44 of the layers 42 are ending at the front side of the lattice body 41 and are accessible from the outside, while the other ends of said strips 44 ending at the rear side of the body 41 may be covered by insulating material not shown in the figure. In contrast to this, the ends of the strips 45 of corresponding location in the different layers 43 are conductively connected to each other, said strips 45 running at right angles with respect to the strips 44 of the layers 42. Separating or insulating layers 47 of the same property as the insulating layers 12 in Fig. 1, have likewise to be provided between two adjacent groups of lattice layers, each of these groups comprising two lattice layers 42 and 43 and intermediate dielectric layer 46, to prevent interference between individual condensers of said adjacent groups. Such insulating layers 47 are also provided on top of the first strip layer 42 and under the lowest strip layer 43.

In Fig. 2, the electric connections of the ends of the strips 45 are obtained by means of vertical conductive or metallic coating strips 48 at the right side of the lattice body 41, said coatings being applied to the open ends of strips 45. Each of these coating strips 48 is grounded through a resistor 20, which may be the characteristic resistance of the network. Each of the coating strips 48 is further connected through a condenser 21 to one of the contact segments 22 of a rotary scanning switch 23, the rotatable contact arm 24 of which is adapted to successively connect the individual vertical coating strips 48 and thereby the poined ends of the strips 45 to one side of an impedance 26, the other side of said impedance being grounded. The resonance circuit can be short circuited and the scanning contact arm 24 directly grounded by closing a manual switch 25. Such controllable impedance means may be coordinated to each of the individual condensers.

An electron gun 27 is provided within the tube 10 opposite the front side of the lattice body 41. The electrons of ray 28 emitted from the gun 27 and impinging upon the free ends of the strips 44 of the layers 42 can be controlled by means of the usual electrostatic horizontal and vertical deflection plates 29 and 30. A collector ring or grid 31 of metal or other conductive material provided in front of the lattice body 41 collects the secondary and free electrons in the same manner as in the cathode ray tube of Fig. 1. The collector ring may be replaced by one or several screens which can be coated with a layer having the property of emitting secondary electrons.

The recording and reproducing operations of the cathode ray tube in Fig. 2 are principally the same as those in Fig. 1. The synchronizing means between the scanning control system of the cathode ray 28 and the rotary scanning switch 23 operate differently in Fig. 2, as the contact arm 24 of said latter scanning switch has to be kept in its position on the segments 22, while all of the lines or rows of the ends of the strips 44 on the front surface of the multi-condenser or lattice body 41 are scanned, i. e. a whole scanning cycle is carried out, before the contact arm 24 is moved to the next segment. During this step, the first vertical series of condensers is acted upon. When the scanning cycle is completed and the contact arm 24 of the switch 23 moved to the next of the segments 22, the next vertical series of individual condensers is acted upon during the new scanning cycle, because the switch segments 22 are connected with vertical series of individual condensers rather than with horizontal as in Fig. 1. Otherwise, the apparatus of Fig. 2 and its operation is the same as that in Fig. 1, so that the previous explanation with respect to the embodiment of Fig. 1 has not to be repeated.

In the embodiment of the invention according to Fig. 2, the scanning cathode ray 28 when directed to the end of one of the strips 44 during the recording primarily acts on one of the individual condensers, i. e. the condenser in which one bit of information is to be stored under said ray action. The individual condensers in the neighborhood of the aforesaid individual condenser are simultaneously influenced, because the lattice strips providing the conductive plates of said individual condensers primarily acted upon are also the plates of adjacent individual condensers and shunt circuits of several series-connected condensers with respect to said primary condenser are obtained due to the structure of the lattice. It has been found that these series-connected condensers in said shunt circuits are changed in their polarization or piezo-electric state to a negligible extent than the individual condenser primarily acted upon, i. e. the voltage acting on each of the series-connected condensers in said shunt-circuits is at the most about one half of that influencing said individual condenser promarily acted upon, so that it is easy to discriminate against said series-connected condensers, or any further individual condensers in the lattice structure influenced by mere fractions of said voltage. These conditions are practically the same throughout the whole lattice structure or multi-condenser body.

The signals or bits of information can be properly and instantaneously reproduced from each of the individual condensers primarily acted upon, since use can be made of "flip-flop" or trigger actions in electric circuits containing these condensers, if their storage medium is ferroelectric. If the ferroelectric dielectric material having the mentioned structure is instantaneously subjected to the action of a voltage, directed against the field represented by the oriented or polarized piezo-electric material, said electrical energy being produced when the electrons of the ray 28 impinge upon the ends 15 of the condenser conductors 14 or the ends of the condenser strips 44, the polarization condition of the material is spontaneously changed resulting in a "trigger" action in the representative condensers. The changed conditions in each of the condensers are detected when these condensers are scanned during the reproducing step which may be carried out at room temperature. In other words, in those condensers, in the ferroelectric layers of which said polarization conditions are changed by the mentioned "trigger" action during the recording step, no or rather insignificant charges will be present, while the condensers with unchanged polarization condition of their ferroelectric storage layers will respond with considerable charges. Thus, during the reproducing step, clear signals will be produced in the loudspeaker or cathode-ray tube in accordance with the instantaneous detection of the changed or unchanged polarization condition of the dielectric in the individual condensers.

The voltage of the scanning ray 28 in Figs. 1 and 2 may be in form of pulses or can be modulated by high frequency or ultra-high-frequency.

It is possible to repeat the reproducing step, i. e. to reproduce the same information or intelligence stored in the multicondenser many times. When it is desired to reuse the multicondenser for storing of new signals the signals present in the individual condensers have to be obliterated for example by rendering uniformly the polarization condition of all condensers.

While in the examples of the operations described the condensers were preoriented prior to the recording step and the voltages applied to these condensers during the recording resulted in a change in sign of the polarization or depolarization or practical obliteration of the piezo-electric property of the dielectric, the recording step may be carried out without preorientation of the condensers. In this case, the action on the condensers is just the opposite as with preorientation, i. e. the signals or bits of information are recorded by polarizing the condensers. The reproducing step is carried out in a similar manner as before.

Although in the multi-condenser lattice body 41 in Fig. 2 the difference in the voltages between the individual condensers primarily acted upon and those secondarily influenced as a result of their incidental connections with said former condensers is big enough to assure a proper operation of the apparatus, as explained in the foregoing, it may be advisable in certain cases to compensate for the voltages across said secondarily-influenced condensers. The compensation may be effected electrostatically by means of a separate electrostatic field acting on the individual condensers and compensating for the voltage across the secondarily influenced condensers.

In the simple embodiment of the present invention, shown in Fig. 4 the cathode tube 10 has principally the same construction as those illustrated in Figs. 1 and 2. The multi-condenser body in this embodiment is a member or unit 51 with preferably a single layer of individual condensers, comprising a dielectric layer 56 made suitably of ferroelectric; i. e., piezo-electric material, such as barium titanate, to the front of which a great number of extremely small metal pieces 53 are applied, for example, by spraying, vaporizing or printing, said small pieces being separated from one another and being uniformly distributed over the whole surface of said layer 56 or arranged in lines or rows to be scanned by the cathode ray 28. The rear side of the dielectric layer 56 is covered with a thin conductive or metallic layer or coating 57. The electric connection with the amplifier circuit 36 is principally the same as in Fig. 1, though no rotary scanning switch 23 is provided in the apparatus of Fig. 4, because the multi-condenser body 51 has only one layer of individual condensers. The small metal pieces 53 may be omitted. In this case, the end of the cathode ray 28 impinging upon the dielectric layer 56 acts as condenser layer at every place scanned.

The scanning step for the recording operation with the apparatus in Figure 4 is carried out basically in the same manner as with the apparatus of Figs. 1 and 2, with the exception that no switching from one group or series of condensers to another by a rotary scanning switch takes place. During the reproducing step with the apparatus of Fig. 4, the cathode ray 28 scans the front of the multi-condenser body 51 in the same manner as during the recording. The electric conditions in the reproducing operation are principally the same as those in the foregoing embodiments.

The scanning means shown in Figs. 1 and 2 may be replaced by any type of switching means, such as used in countercircuits comprising a line of mechanical or electronic flip-flop stepping switches, or by another cathode ray operating in synchronism and/or a certain ratio with the first cathode ray. It is also possible to use a light ray in place of the rotary switch 23. In this case the resistors 20 suitably applied as coatings to the side of the multi-condenser body 11 or 41 are made of light-sensitive resistance material, such as lead sulfide, selenium, etc., and the light beam successively scans said resistors in synchronism with the cathode ray 28, whereby their electric resistance is temporarily decreased so that conductive paths to ground are obtained through said resistors. The recording and reproducing operations of this modified apparatus are otherwise the same as those in Figs. 1 and 2.

A cascade voltage multiplier connected across each of the resistors 20 in Figs. 1, 2 and 4 may be used as amplifying means for the recording and reproducing.

In place of a lattice structure shown in Fig. 2, a woven structure may be used, i. e. the condenser strips can be interlaced as in an ordinary woven fabric. In this case, these strips have to be individually insulated by or covered with a dielectric of ferroelectric material.

In the multi-condenser body, shown in the embodiment of Fig. 5, two thin insulating sheets 66 and 67, for example, of paper are holding between them lattice structures of conductors 68 and 69 crossing one another. These conductors 68 and 69 may be deposited on the insulating sheets 66 and 67, respectively, by coating, vaporizing or printing. An intermediate layer 70 of ferroelectric material separates the conductors 68 from the conductors 69. Said layer 70 may be made of a thin flexible sheet of insulating or semiinsulating material, for example, of paper in which ceramic substances having ferro-electric, i. e. piezo-electric properties are incorporated, for example as fillers. The conductors 68 and 69 may be applied to opposite surfaces of said layer 70 rather than to the insulating sheets 66 and 67, i. e. they may be deposited on the sides of the thin sheet 70 by spraying, vaporizing, or printing. Thin insulating layers, not shown in the drawing, firmly attached to the outer sides of the thin intermediate sheet 70 and entirely covering the conductors 68 and 69 on the respective sides of sheet 70 complete the structure of this multi-condenser sheet unit. These latter insulating layers may also have ferroelectric properties and may be made in a similar manner as the center or intermediate sheet 70 of paper having filler substances of the required properties. The multi-condenser sheet can be rolled to obtain a structure similar to an ordinary coil condenser. The multi-condenser sheet in Fig. 5 is folded several times and a meander-like structure is obtained. If this meander-like multi-condenser body would be built into the tube 10 of Fig. 2 replacing the lattice body 41 therein, the side of the multi-condenser body showing the meander-like turns and the ends of the conductors 69 will face the gun 27, so that they can be scanned by the cathode ray 28, while the ends of the conductors 68 will be connected to the resistors 20 and the condensers 21. The operation of the apparatus remains the same as in the foregoing embodiments.

Although in accordance with the provisions of the patent statutes this invention is described as embodied in concrete forms and the principle of the invention has been explained together with the best mode in which it is now contemplated applying that principle, it will be understood that the elements, combinations and methods shown and described are merely illustrative and that the invention is not limited thereto, since alterations and modifications will readily suggest themselves to persons skilled in the art without departing from the true spirit of the present invention or from the scope of the annexed claims.

I claim:

1. An apparatus for electrostatic recording and producing of signals representing information comprising in combination, a plurality of small condensers each including a material having electric dipoles therein which may be remanently aligned and the alignment of which may be remanently changed, said condensers being incorporated in a multi-condenser structure, means to electrostatically energize said small condensers in succession, each of said small condensers being adapted and arranged to record one bit of information under the influence of said energizing means, and means to detect the electrostatic conditions of said condensers in the same sequence during the reproducing.

2. An apparatus for electrostatic recording and reproducing of signals representing information comprising in combination, a plurality of small condensers incorporated in a multi-condenser network, a ferroelectric dielectric layer in each of said small condensers, an intramolecular and intermolecular structure of which is adapted to be remanently changed in response to a signal applied instantaneously thereto while said layer is at a temperature below its Curie point, means to electrostatically energize each of said small condensers to remanently change the intramolecular and intermolecular structure of its dielectric layer to record one bit of information in each of them, and means to detect said remanent change in each of said dielectric layers to reproduce the information.

3. An apparatus according to claim 2, wherein heating means are provided being adapted to heat said ferroelectric dielectric layers to a temperature in the neighborhood of the transition temperature and to maintain said temperature during the recording step.

4. An apparatus according to claim 2, wherein control means are associated with said energizing means being adapted to cause the latter to energize said small condensers comprising ferroelectric material in succession during the recording step and to connect said small condensers with said detecting means in the same sequence during the reproducing step.

5. An apparatus according to claim 2, wherein said dielectric layers are piezo-electric.

6. An apparatus according to claim 2, said dielectric layers comprising barium titanate.

7. An apparatus for electrostatic recording and reproducing of signals representing information comprising in combination, a plurality of small condensers incorporated in a multi-condenser network, a piezo-electric layer in each of said condensers, the polarization of each piezo-electric layer being adapted to be remanently changed in response to a signal applied instantaneously thereto while said layer is at a temperature below its Curie point, means to maintain said piezo-electric layers at a temperature below their Curie-point during the recording, a source of voltage impulses representing bits of information to be recorded, means to connect said source to said condensers in a certain sequence during the recording step to remanently change the piezo-electric property in some of said condenser layers, means to subject said piezo-electric layers to mechanical stresses during the reproducing step, means to detect during the reproducing step charges resulting from said mechanical stresses in the condensers with piezo-electric layers in the same sequence as during the recording.

8. An apparatus according to claim 7 wherein said multi-condenser is mounted in a cathode ray tube, said voltage impulse source being an electron gun located opposite to and emitting electron rays towards said condensers, scanning means adapted to move the electron ray emitted from said gun from one condenser to the following in a predetermined sequence, and means to modulate said electron ray by the signals to be recorded.

9. An apparatus according to claim 7, a high-frequency generator, at least one piezo-electric member associated with said piezo-electric condensers, means to connect said member to said generator, whereby the current produced by said generator and transmitted to said member results in oscillations causing mechanical stresses in said piezo-electric condensers.

10. An apparatus according to claim 7, a sonic-frequency generator, at least one piezo-electric member associated with said piezo-electric condenser layers, means to connect said member to said generator, whereby the current pulses produced by said generator and transmitted to said member results in oscillations causing pulsed mechanical stresses in said piezo-electric condensers.

11. In an electrostatic information storage and information reproducing apparatus, a condenser comprising spaced-apart conductive layers and a dielectric material located between said layers, said dielectric material having ferroelectric properties, and means to remanently change the initial polarization of said dielectric material to record information therein.

12. In an electrostatic information storage and information reproducing apparatus, a condenser comprising a pair of spaced-apart conductive layers and a layer of semiconductive material sandwiched between said conductive layers, said semiconductive material having electric dipoles therein which may be remanently aligned and the alignment of which may be remanently changed, and means to remanently change a previous alignment of said dipoles to record information in said semi-conductive material.

13. In an electrostatic information storage and information reproducing apparatus, a condenser having therein a dielectric material including barium titanate, and means to remanently change the initial polarization of said dielectric material to record information therein.

14. In an electrostatic information storage and information reproducing apparatus, a condenser having therein a layer of dielectric material, said dielectric material having electric dipoles therein which may be remanently aligned and the alignment of which may be and means to successively remanently change the alignment of said electric poles.

15. In an electrostatic information storage and information reproducing apparatus, a condenser having therein a piezoelectric dielectric material, the intermolecular and intramolecular structure of which can be remanently changed according to the information to be stored therein, remanently changed, and means to successively remanently change the alignment of said electric dipoles.

16. In an electrostatic information storage and information reproducing apparatus, a condenser comprising spaced-apart conductive layers, a semiconductive material located between said layers, and a dielectric material located between said layers, said dielectric material having ferroelectric properties, and means to remanently change the initial polarization of said dielectric material to record information therein.

17. In an electrostatic recording and reproducing apparatus, a condenser including a dielectric material having electric dipoles therein which may be remanently aligned and the alignment of which may be remanently changed, means to remanently align said dipoles to record information in said dielectric material, and means to remanently change said alignment to reproduce said recorded information.

18. A recording and reproducing apparatus comprising a multicondenser structure having a common conductive layer, a plurality of separated conductive strips and a layer of ferroelectric dielectric material located between said common conductive layer and said conductive strips whereby each of said conductive strips is one plate of a condenser, means to energize said conductive strips in sequence as desired to remanently record information in said multicondenser structure, and means to change the energization of said conductive strips in the same sequence to remanently reverse the remanent polarization established in said dielectric material during the recording step to reproduce said recorded information.

19. A recording and reproducing apparatus comprising a multicondenser structure having a common conductive layer, a plurality of separated conductive strips and a layer of dielectric material located between said common conductive layer and said conductive strips whereby each of said conductive strips is one plate of a condenser, said dielectric material having an intermolecular and intramolecular structure which can be remanently changed according to the information to be stored therein, means to energize said conductive strips in sequence as desired to remanently record information in said multicondenser structure, and means to change the energization of said conductive strips in the same sequence to remanently reverse the polarization established in said dielectric material during the recording step to reproduce said recorded information.

20. A recording and reproducing apparatus comprising a multicondenser structure having a common conductive layer, a plurality of separated conductive strips and a layer of dielectric material located between said common conductive layer and said conductive strips whereby each of said conductive strips is one plate of a condenser, said dielectric material having electric dipoles therein which may be aligned and the alignment of which may be remanently changed, means to energize said conductive strips in sequence as desired to remanently record information in said multicondenser structure, and means to change the energization of said conductive strips in the same sequence to remanently reverse the polarization established in said dielectric material during the recording step to reproduce said recorded information.

21. A recording and reproducing apparatus comprising a multicondenser structure having a first group of separated conductive strips, a second group of separated conductive strips positioned transversely with respect to said first group to form a lattice structure and a layer of ferroelectric dielectric material located between said first and second groups of conductive strips whereby each of said conductive strips is one plate of a condenser, means to energize one group of said conductive strips in sequence as desired to record information in said multicondenser structure, and means to deenergize said conductive strips in the same sequence to reproduce said recorded information.

22. A recording and reproducing apparatus comprising a multicondenser structure having a first group of separated conductive strips, a second group of separated conductive strips positioned transversely with respect to said first group to form a lattice structure and a layer of dielectric material located between said first and second groups of conductive strips whereby each of said conductive strips is one plate of a condenser, said dielectric material having an intermolecular and intramolecular structure which can be spontaneously and remanently changed according to the information to be stored therein, means to energize one group of said conductive strips in sequence as desired to record information in said multicondenser structure, and means to deenergize said conductive strips in the same sequence to reproduce said recorded information.

23. A recording and reproducing apparatus comprising a multicondenser structure having a first group of separated conductive strips, a second group of separate conductive strips positioned transversely with respect to said first group to form a lattice structure and a layer of dielectric material located between said first and second groups of conductive strips whereby each of said conductive strips is one plate of a condenser, said dielectric material having electric dipoles therein which may be aligned and the alignment of which may be remanently changed, means to energize one group of said conductive strips in sequence as desired to record information in said multicondenser structure, and means to deenergize said conductive strips in the same sequence to reproduce said recorded information.

24. In an electrostatic information storage and information reproducing apparatus a condenser having therein a dielectric material having ferroelectric properties, means to remanently change the initial polarization of said dielectric material to record information therein, and means to change the polarization established in said dielectric material during the recording step to reproduce said recorded information.

25. A recording and reproducing apparatus comprising a multicondenser structure having a first group of separated conductive strips, a second group of separated conductive strips positioned transversely with respect to said first group to form a lattice structure and ferroelectric dielectric material located between said first and second groups of conductive strips at each location where a strip of said first group crosses a strip of said second group whereby each of said conductive strips is a plate of a condenser, means to energize one group of said conductive strips as desired to record information in said multicondenser structure, and means to de-energize said conductive strips to reproduce said recorded information.

26. A memory apparatus comprising a plurality of condensers each including a layer of dielectric material having ferroelectric properties, the polarization of each layer being adapted to be remanently changed in response to a signal applied instantaneously thereto while said layer is at a temperature below its Curie point, and electron ray producing means operatively associated with said condensers to scan said condensers to record bits of information in said condensers or to reproduce bits of information from said condensers.

27. A memory apparatus comprising a multicondenser structure wherein each condenser includes a layer of dielectric material having ferroelectric properties and also includes an electron responsive means for recording a bit of information in the condenser or reproducing a bit of information from the condenser, the polarization of each layer being adapted to be remanently changed in response to a signal applied instantaneously thereto while said layer is at a temperature below its Curie point, electron ray producing means operatively associated with said electron responsive means to scan said electron responsive means in a predetermined manner, and means operatively associated with said electron ray producing means to control the electron ray produced thereby during scanning to record bits of information in condensers of said multicondenser structure or reproduce bits of information from condensers in said multicondenser structure.

28. A memory apparatus comprising a multicondenser structure wherein each condenser includes a dielectric material having ferroelectric properties and at least one electrode of each condenser includes electron target means, a cathode ray tube operatively associated with said multicondenser structure, and means to energize said cathode ray tube to cause the cathode ray produced thereby to scan said electron target means in a predetermined manner.

29. A memory apparatus comprising a multicondenser structure wherein each condenser includes a dielectric material having ferroelectric properties and also includes electron target means, a load circuit connected to each condenser to receive signals therefrom, an electron ray producing means operatively associated with said electron target means, and means to energize said electron ray producing means to cause the electron ray produced thereby to scan said target means in a predetermined manner to deliver signals to said load circuit.

30. A memory apparatus comprising a multicondenser structure wherein each condenser includes a dielectric material having ferroelectric properties, electron target means operatively associated with at least one electrode of each condenser, electron beam producing means operatively associated with said multicondenser structure, means connected to said electron beam producing means to energize said electron beam producing means, means connected to said electron beam producing means to control the electron beam produced by said means to cause said electron beam to scan said electron target means in a predetermined manner, and electron collector means located adjacent said multicondenser structure and operative to control the polarity of the surface charge on individual condensers of said multicondenser structure.

31. A memory apparatus comprising a multicondenser structure wherein each condenser includes a dielectric material having ferroelectric properties and at least one electrode of each condenser includes electron target means, a cathode ray tube located adjacent said target means, electron collector means also located adjacent said target means, and means connected to said cathode ray tube to cause the cathode ray produced thereby to scan said target means in a predetermined manner, said target means being highly secondary electron emissive and said electron collector means being positioned sufficiently closely to the target means to control secondary electrons emitted by said target means.

32. In a memory apparatus, a condenser having therein a layer of dielectric material having ferroelectric properties, the polarization of each layer being adapted to be remanently changed in response to a signal applied instantaneously thereto while said layer is at a temperature below its Curie point, and electron ray producing means operatively associated with said condenser to record a bit of information in said condenser.

33. In a memory apparatus, a condenser having therein a layer of dielectric material having ferroelectric properties, the polarization of each layer being adapted to be remanently changed in response to a signal applied instantaneously thereto while said layer is at a temperature below its Curie point, and electron ray producing means operatively associated with said condenser to reproduce a bit of information from said condenser.

34. In a memory apparatus, a condenser having therein a layer of dielectric material having ferroelectric properties, the polarization of each layer being adapted to be remanently changed in response to a signal applied instantaneously thereto while said layer is at a temperature below its Curie point, and electron ray producing means operatively associated with said condenser to record a bit of information in said condenser or to reproduce a bit of information from said condenser.

References Cited in the file of this patent

UNITED STATES PATENTS

| | | |
|---|---|---|
| 1,891,780 | Rutherford | Dec. 20, 1932 |
| 2,154,127 | Hollmann | Apr. 11, 1939 |
| 2,164,520 | Henroteau | July 4, 1939 |
| 2,197,863 | Iams | Apr. 23, 1940 |
| 2,219,021 | Riesz | Oct. 22, 1940 |
| 2,293,899 | Hansom | Aug. 25, 1942 |
| 2,394,670 | Detrick | Feb. 21, 1946 |
| 2,420,652 | Chilowsky | May 20, 1947 |
| 2,486,560 | Gray | Nov. 1, 1949 |
| 2,501,788 | Ross | Mar. 28, 1950 |
| 2,527,652 | Pierce | Oct. 31, 1950 |
| 2,571,163 | Rines | Oct. 16, 1951 |
| 2,625,035 | Firestone | Jan. 13, 1953 |
| 2,633,543 | Howatt | Mar. 31, 1953 |
| 2,649,027 | Mason | Aug. 18, 1953 |

UNITED STATES PATENT OFFICE

CERTIFICATE OF CORRECTION

Patent No. 2,793,288 May 21, 1957

Charles F. Pulvari

It is hereby certified that error appears in the above numbered patent requiring correction and that the said Letters Patent should read as corrected below.

In the drawings, Sheet 1, Fig. 4, delete the electrical lead lines identified by the reference numeral 64 in the original drawings and to make the showing of the rectangular block within the tube envelope 10 consist of a single dielectric layer 56 having metallic particles 53 on one side of the layer and a thin conductive or metallic layer or coating 57 on the other side of the dielectric layer; column 7, line 22, for "poined" read -- joined --; column 8, line 8, for "promarily" read -- primarily --; column 10, line 55, for "an" read -- the --; column 12, line 1, after "be" insert -- remanently changed, --; line 3, for "poles" read -- dipoles --; line 9, strike out "remanently changed,"; lines 10 and 11, strike out "the alignment of said electric dipoles" and insert instead -- the intermolecular and intramolecular structure of said piezo-electric dielectric material --; column 13, line 29, for "separate" read -- separated --.

Signed and sealed this 15th day of October 1957.

(SEAL)
Attest:
KARL H. AXLINE
Attesting Officer

ROBERT C. WATSON
Commissioner of Patents